United States Patent
Ramey

[15] 3,673,778
[45] July 4, 1972

[54] WINDROW ATTACHMENT FOR MOWERS

[72] Inventor: Leslie C. Ramey, Route 7 Liberty Church Road, Macon, Ga. 31206

[22] Filed: May 11, 1971

[21] Appl. No.: 142,140

[52] U.S. Cl. ........................................................56/320.2
[51] Int. Cl. ................................................A01d 35/02
[58] Field of Search ...................356/320.2, 192, 255, 17.2, 356/17.5

[56] References Cited

UNITED STATES PATENTS

| | | | |
|---|---|---|---|
| 2,495,032 | 1/1950 | Stubl | 56/192 |
| 2,756,556 | 7/1956 | Watkins | 56/189 |
| 2,578,880 | 12/1951 | Doyle | 56/17.2 |
| 3,020,693 | 2/1962 | Sears | 56/320.2 |
| 3,391,524 | 7/1968 | Nickoloff et al. | 56/320.2 |

FOREIGN PATENTS OR APPLICATIONS

| | | | |
|---|---|---|---|
| 106,617 | 7/1965 | Norway | 56/320.2 |

Primary Examiner—Russell R. Kinsey
Attorney—Le Blanc & Shur

[57] ABSTRACT

The attachment includes a generally inverted L-shaped member having a horizontally disposed base portion hingedly mounted along its free edge to a bracket secured to the mower housing adjacent the clipping discharge opening. The opposite edge of the base portion carries a depending flange or baffle which angles laterally outwardly from the forward to the rear end of the attachment. The attachment is pivotable between a position wherein the baffle lies in horizontal spaced registry from the discharge opening for deflecting the clippings to form a windrow and a second position wherein the attachment overlies the mower housing with the baffle thereof extending substantially vertically upwardly from the base portion permitting non-interference with and free scattering and distribution of the clippings flowing through the discharge opening over the mowed area.

7 Claims, 5 Drawing Figures

PATENTED JUL 4 1972
3,673,778
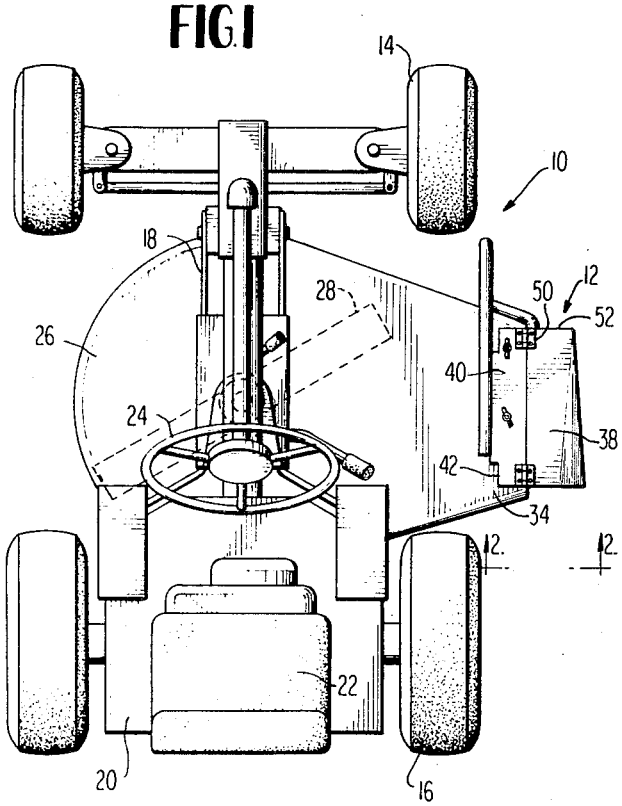
FIG.1
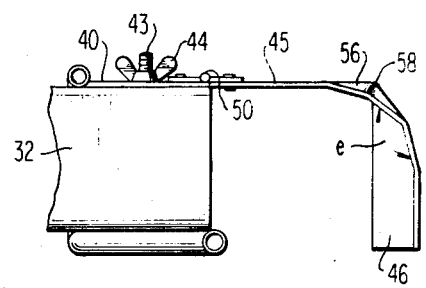
FIG.2
FIG.3
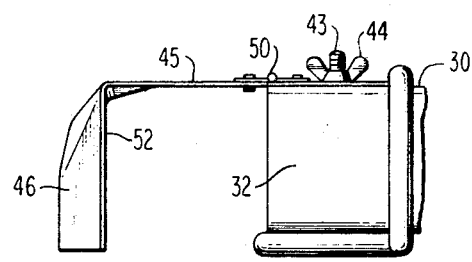
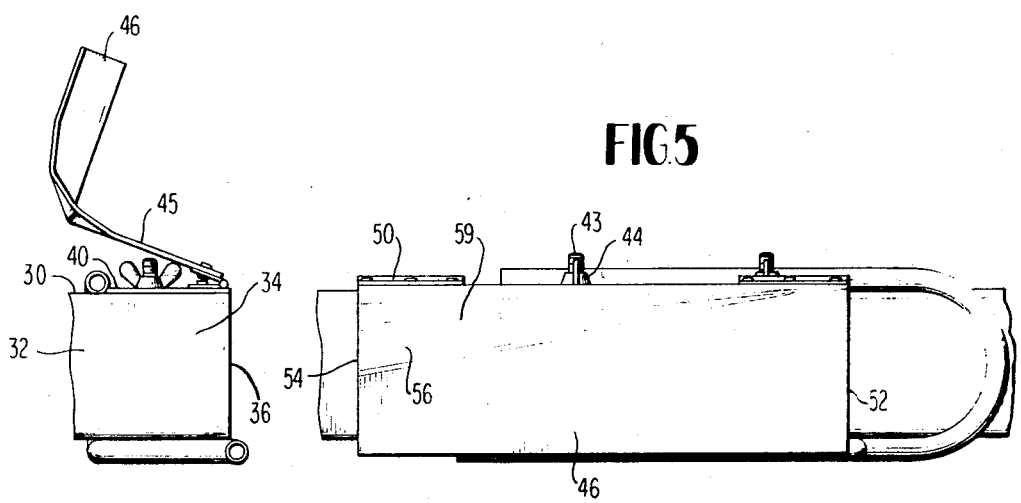
FIG.4
FIG.5
INVENTOR
LESLIE C. RAMEY
BY  Le Blanc & Shur
ATTORNEYS

WINDROW ATTACHMENT FOR MOWERS

The present invention relates to mowers for cutting grass and the like and more particularly relates to an attachment for a mower of the rotary blade cutting type for windrowing the cuttings.

One of the problems in utilizing mowers is the accumulation of cuttings or clippings on the mowed ground which, if left on the ground, results in an over-mulched condition, provides a breeding place for insects and disease and generally creates an unhealthy yard condition. While it is possible to manually rake the entirety of the area mowed to manually collect the clippings, this is time consuming and exhausting labor.

Windrowing attachments for mowers and the like have been previously designed and constructed. One such attachment is described and illustrated in U.S. Pat. No. 2,495,032, and includes a generally channel-shaped element pivotally disposed on the side of a rotary type mower through which the cuttings or clippings are discharged. The clippings are deflected by a leg of the channel and form a windrow. The channel-shaped windrow, however, is not considered to be the optimum shape for a windrowing attachment.

Another prior windrow attachment is described and illustrated in U.S. Pat. No. 3,020,693. In this attachment, the attachment is generally L-shaped and mounted at the grass discharge opening of a mower. However, this windrow attachment does not provide an enlarged cross sectional area at its rear or discharge end to accommodate the increased number of clippings discharged therethrough as compared with the front portion thereof. In other words, the windrow attachment may well choke or become clogged with clippings.

The present invention provides a novel and improved windrow attachment which minimizes and/or eliminates the foregoing and other problems associated with prior windrow attachments and provides an improved windrow attachment having various advantages in construction, operation and use as compared with such prior windrow attachments. Particularly, the present windrow attachment includes an elongated inverted generally L-shaped member having a generally horizontally disposed base portion and a flange portion or baffle depending along one side of its base portion. A mounting bracket is provided and secured to the horizontal portion of the discharge chute on the mower directly adjacent the discharge opening. The base portion of the member is pivotally mounted to the bracket whereby the attachment is mounted for movement between a first position in which it is operative to deflect the clippings or cuttings flowing through the discharge opening to form a windrow and a second position pivoted to overlie the mower discharge chute housing out of the way of the clippings flowing through the discharge chute. The windrow attachment hereof is constructed to provide an increasing cross sectional area from front to rear and this avoids choking or clogging the attachment with the clippings. To this end, the windrow attachment hereof is specifically formed of galvanized sheet metal bent to provide a plurality of triangularly shaped integral segments having common apices at the front portion of the attachment and extending to the rear edge thereof and forming a generally arcuate edge portion connecting between the base portion and the baffle. Also, the windrow attachment can be readily and easily fabricated in this form at low cost.

Accordingly, it is a primary object of the present invention to provide a novel and improved windrow attachment for mowers of the rotary blade type.

It is another object of the present invention to provide a novel and improved windrow attachment which is readily and easily fabricated at low cost.

It is a further object of the present invention to provide a novel and improved windrow attachment wherein the area defined by the windrow attachment increases in cross section from front to rear.

It is a still further object of the present invention to provide a novel and improved windrow attachment which can be readily attached to existing mowers of the rotary type.

It is a still further object of the present invention to provide a novel and improved windrow attachment which can be readily pivoted and maintained in an out-of-the-way position wherein the clippings or cuttings can be freely distributed and scattered over the mowed area.

These and further objects and advantages of the present invention will become more apparent upon reference to the following specification, appended claims and drawings, wherein:

FIG. 1 is a plan view of a mower of the rotary blade type with a windrow attachment constructed in accordance with the present invention secured thereto and illustrated in an operative position to form a windrow;

FIG. 2 is a fragmentary elevational view of the mower discharge chute and the novel and improved attachment hereof and taken generally about on line 2—2 in FIG. 1;

FIG. 3 is a view similar to FIG. 2 and looking in the opposite direction at the forward end of the attachment;

FIG. 4 is a view similar to FIG. 2 and illustrating the attachment in an inoperative position overlying the discharge chute of the mower; and FIG. 5 is a fragmentary side elevational view thereof.

Referring now to the drawings, particularly to FIG. 1, there is illustrated a mower of the rotary blade type, generally indicated 10, to which is secured a windrow attachment, generally indicated 12, constructed in accordance with the present invention. It will be appreciated that the windrow attachment 12 hereof can be utilized with any type of rotary mower and that the mower specifically illustrated is exemplary only and described and illustrated only to show the environment in which the present windrow attachment is employed. Particularly, the illustrated mower 10 is a riding type rotary mower comprising a pair of front wheels 14, a pair of rear wheels 16, a frame 18 interconnecting the pairs of wheels 14 and 16, an engine 20 which may be any suitable type, preferably gasoline powered, a seat 22 and a steering wheel 24. Mower 10 also includes a rotary mower housing 26 in which a cutting blade 28 is rotatably mounted on a central shaft driven by motor 20. The housing 26 includes an upper generally horizontally disposed plate 30 having a downturned flange 32 substantially about its entire periphery. On one side of the mower, there is provided a discharge chute 34 which is of generally inverted U-shape having a large opening adjacent the periphery of housing 26 and converging laterally outwardly to terminate in a reduced outer opening 36. It will be appreciated that in this type of rotary mower, the clippings or cuttings are propelled to one side of the mower and normally expelled through the discharge chute 34 for distribution and scattering along the ground. It will be appreciated that the windrow attachment 12 hereof is provided in order that the clippings or cuttings can be windrowed, that is, left in rows as the mower passes.

The windrow attachment 12 hereof is comprised of two basic elements, an element 38 adapted to extend beyond the discharge opening to effect the windrowing and a mounting bracket or plate 40 for securing element 38 to the mower housing 26. The bracket 40 comprises a flat plate 42 having a pair of openings which lie in registry with corresponding openings in the upper portion of discharge chute 34 whereby screws 43 can be received from the underface of the discharge chute securing plate 42 to chute 34 by means of wing nuts 44.

Windrow attachment element 38 comprises a generally inverted L-shaped galvanized sheet metal member having a generally horizontally disposed base portion 45 and a flange or baffle 46 depending along the outside edge thereof. The adjacent edges of plate 40 and base portion 45 are provided with hinges 50. It will be appreciated that hinges 50 connect windrow element 38 to mounting plate 40 on the side thereof remote from baffle 46 whereby baffle 46, in the position thereof illustrated in FIGS. 1–3, lies in spaced horizontal registry with the reduced terminal portion of discharge chute 34. Base portion 45 extends generally horizontally to and parallel with the upper face of the discharge chute 34 and blade housing 26. Flange or baffle 46 flares laterally outwardly from the discharge chute opening in a direction toward the after portion of attachment 12. It will thus be appreciated that the area defined by baffle 46 and base portion 45 of windrow element 38 and a vertical plane containing the reduced discharge chute opening increases from the forward end of attachment 12 to its rear end. In this manner, the cuttings which are deflected against baffle 46 cannot clog or choke off the exit opening between the rear edge of baffle 46 and the rear edge of discharge chute 34.

It is a particular feature hereof that the base portion 45 and baffle 46, at the forward leading or edge 52 of attachment 12, form a right angle one with the other while base portion 45 and baffle 46 at the rear edge 54 of attachment 12 are joined one to the other through a generally arcuate flared portion 56 permitting baffle 46 to flare outwardly.

Preferably, the juncture of base portion 45 and baffle 46 is formed by shaping element 38 to form a plurality of generally triangularly shaped segments 56 having a common apex 58 at the forward edge 52 of element 38 with their bases forming a part of the rear edge 54 of element 38. The segments are formed by bending the baffle 46 progressively about fold lines 59 having a common apex 58, the fold lines 59 forming common sides for adjacent triangularly shaped segments. Preferably, these segments 56 are similarly angularly related to adjacent segments. The foregoing construction facilitates construction of element 38 from sheet metal while permitting the baffle 46 to flare outwardly to provide increasing cross sectional area from the front to the rear of the attachment whereby choking or clogging of the exit thereof is precluded.

In a preferred form of the present invention, the windrow element 38 is preferably 12 inches long with the base portion extending about 4.125 inches along the front edge of base portion 45 and the trailing edge of baffle 46 extending from the edge of base portion 45 attached to bracket 40 a distance of 5 inches. Preferably, three triangular segments 56 are provided to flare baffle 46 outwardly and these, at their bases along edge 54, extend about 1 inch and obtain included obtuse angles of 157.5°, indicated at e in FIG. 2, with adjacent segments and base or flange portions.

In use, the windrow attachment 12 is secured to the discharge chute of the mower in a manner such that element 38 is pivotal between a first position, illustrated in FIGS. 1-3 and 5, wherein base portion 45 extends horizontally with baffle 46 depending from the base in spaced horizontal registry with the discharge opening and a second position illustrated in FIG. 4 wherein base portion 45 overlies the discharge chute 34 and the baffle 46 extends substantially vertically. If it is desired that the cuttings or clippings from the lawn or the like to be mowed should be scattered or distributed over the lawn, element 38 is simply pivoted upwardly out of the way to the position illustrated in FIG. 4. In this manner, the discharge chute opening is not obstructed and the clippings are freely distributed and scattered over the lawn. If it is desired to form a windrow, element 38 is pivoted to the position illustrated in FIGS. 1-3 and 5. In the latter position, baffle 46 is spaced from the discharge chute opening and provides a deflector or stop for the cuttings discharged through the opening. The cuttings, upon striking the baffle 46, fall to the ground substantially directly below the inside face of baffle 46 to form a windrow. Since the rear portions of baffle 46 are spaced further from the mower discharge opening than the forward portion thereof, the cuttings or clippings will not clog or otherwise choke off the exit end of element 38. Thus, use of the deflector to windrow the clippings reduces the time required to rake clippings by 80 to 90 percent and precludes overmulching of the lawn. Also, the deflector can be utilized to windrow leaves in the same manner as grass clippings and/or pine straw.

It will be appreciated that the attachment hereof can be used on other types of lawn mowers, both push and riding types. Moreover, the size of the deflector set forth above is considered exemplary only and for a particular type of mower. The size of the attachment would depend upon the length of the discharge chute and depth of blade housing of a particular mower. The attachment may also be used in connection with mowers having curved blade housings by compensating for the curve with longer bolts and grommets.

The invention may be embodied in other specific forms without departing from the spirit or essential characteristics thereof. The present embodiment is there-fore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mower attachment for windrowing cuttings flowing through the discharge opening of a mower housing comprising an elongated inverted generally L-shaped element including a generally horizontally disposed base portion and a baffle depending along one side thereof, a mounting bracket adapted to be secured to the mower housing adjacent the discharge opening thereof, means for securing said bracket to the mower housing, means pivotally connecting said bracket to said element along the edge of said base portion remote from said depending baffle, said element being pivotal between a first position with said baffle in spaced horizontal registry with the mower discharge opening to windrow the clippings flowing therethrough and a second position with said base portion overlying the mower housing and said baffle extending substantially in a generally vertical direction, said baffle flaring outwardly from said base portion from one end of said attachment to its opposite end with said base portion in said first position of said element lying in a generally horizontal plane throughout its full extent, the edges of said base portion and baffle at said one end thereof forming substantially a right angle, the edges of said base portion and baffle at said opposite end thereof forming a generally arcuate edge at their juncture, said juncture between said base portion and said baffle including a plurality of generally triangularly shaped portions of said attachment each forming included obtuse angles with adjacent triangular shaped portions, the bases of said triangular portions forming said generally arcuate edge.

2. The attachment according to claim 1 wherein said attachment is formed of sheet metal.

3. The attachment according to claim 1 wherein said pivotal connecting means includes a pair of spaced hinges.

4. In combination with a mower having a housing with a depending skirt defining a chamber, a rotor carried by said housing for rotation within said chamber, and an inverted channel-shaped chute in communication at its inner end with said chamber and terminating at its outer end in a discharge opening having a discrete length, a mower attachment for windrowing cuttings flowing outwardly from said chamber through said chute and said discharge opening, said attachment including an elongated inverted generally L-shaped element substantially coextensive in length with said discharge opening, said element including a generally horizontally disposed base portion and a baffle depending along one side thereof, a mounting bracket secured to said chute adjacent the discharge opening thereof, means for securing said bracket to said mower housing, means pivotally connecting said bracket and said element along the edge of said base portion remote from said depending baffle, said element being pivotal between a first position with said baffle in spaced horizontal registry with said discharge opening to windrow the clippings flowing therethrough and a second position with said base portion overlying said chute and said baffle extending in a generally vertical direction, said baffle flaring outwardly relative to a substantially vertical plane passing through the outer end of said chute from one end thereof to its opposite end whereby the cross-sectional area defined by said baffle, base portion and said plane increases in a direction from said one end to said opposite end, said base portion in said first position of said element lying in a generally horizontal plane throughout its full extent with said increase in area being provided substantially solely by the outward flare of said baffle relative to said plane, the juncture of said baffle and base portion forming a generally arcuate surface increasing in area from the one end of said element to its opposite end, said arcuate surface lying in direct lateral opposition to said discharge opening for deflecting the cuttings flowing therethrough.

5. The apparatus according to claim 4 wherein the edges of said base portion and baffle at said one end thereof form substantially a right angle, the edges of said base portion and baffle at said opposite end thereof forming a generally arcuate edge of their juncture.

6. The apparatus according to claim 5 wherein the juncture between the base portion and said baffle includes a plurality of generally triangularly shaped portions of said attachment each forming included obtuse angles with adjacent triangular shaped portions, the bases of said triangular portions forming said generally arcuate edge.

7. The apparatus according to claim 4 wherein said attachment is formed of sheet metal.

* * * * *